United States Patent
Pietrasz et al.

(10) Patent No.: US 12,347,849 B2
(45) Date of Patent: Jul. 1, 2025

(54) MULTI-LAYER COATING USING IMMISCIBLE SOLVENT SLURRIES

(71) Applicant: Ford Global Technologies, LLC, Dearborn, MI (US)

(72) Inventors: Patrick Pietrasz, Ann Arbor, MI (US); Eunsung Lee, Novi, MI (US); Gunho Kwak, Novi, MI (US); Feng Li, Troy, MI (US); Chi Paik, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 761 days.

(21) Appl. No.: 17/672,164

(22) Filed: Feb. 15, 2022

(65) Prior Publication Data

US 2023/0261176 A1    Aug. 17, 2023

(51) Int. Cl.
    *H01M 4/36*     (2006.01)
    *H01M 4/04*     (2006.01)
    *H01M 4/1393*   (2010.01)
    *H01M 4/1395*   (2010.01)
    *H01M 4/46*     (2006.01)
    *H01M 4/583*    (2010.01)

(52) U.S. Cl.
    CPC ......... *H01M 4/366* (2013.01); *H01M 4/0402* (2013.01); *H01M 4/1393* (2013.01); *H01M 4/1395* (2013.01); *H01M 4/466* (2013.01); *H01M 4/583* (2013.01)

(58) Field of Classification Search
    CPC .. H01M 4/366; H01M 4/0402; H01M 4/1393; H01M 4/1395; H01M 4/466; H01M 4/583; H01M 4/0404; H01M 4/131; H01M 4/133; H01M 4/1391; H01M 4/505; H01M 4/525; H01M 4/587; H01M 50/46; H01M 4/667; H01M 4/625; Y02E 60/10
    See application file for complete search history.

(56) References Cited

U.S. PATENT DOCUMENTS

| | | | |
|---|---|---|---|
| 10,991,942 B2 | 4/2021 | Yao et al. | |
| 2021/0005927 A1 | 1/2021 | Hoffert et al. | |
| 2021/0399308 A1* | 12/2021 | Kim | H01M 4/622 |

FOREIGN PATENT DOCUMENTS

| | | | | |
|---|---|---|---|---|
| CN | 104282911 A | * | 1/2015 | ........ H01M 10/0525 |
| CN | 111162279 | | 5/2020 | |
| DE | 102018221828 | | 6/2020 | |

OTHER PUBLICATIONS

Translation of CN-104282911-A (Year: 2015).*
Diehm, et al., Simultaneous Multilayer Coating of Lithium-ion Battery Electrodes, Semantic Scholar, 2018, 4 pages.

* cited by examiner

*Primary Examiner* — Anca Eoff
*Assistant Examiner* — Madison Leigh Kyle
(74) *Attorney, Agent, or Firm* — Burris Law, PLLC

(57) ABSTRACT

A method for producing a multi-layer coating on a substrate for an anode or cathode includes preparing a first mixture including a first solvent and a first active material, preparing a second mixture including a second solvent and a second active material, combining the first mixture and the second mixture to form a slurry, and coating the substrate with the slurry. The first solvent and the second solvent are immiscible.

20 Claims, 6 Drawing Sheets

MULTI-LAYER COATING USING IMMISCIBLE SOLVENT SLURRIES

FIELD

The present disclosure relates to a method for producing a multi-layer coating on a substrate for an anode or cathode.

BACKGROUND

The statements in this section merely provide background information related to the present disclosure and may not constitute prior art.

Multi-layer coatings for lithium-ion batteries can offer efficient mass transport and loadings of heterogeneous materials. These coatings also provide improved conductivity and battery life and performance. However, preparing such conventional multi-layer coatings involve a large number of steps and require tools and equipment which increase expense and process time.

The present disclosure addresses these and other issues related to multi-layer coatings for lithium-ion batteries.

SUMMARY

This section provides a general summary of the disclosure and is not a comprehensive disclosure of its full scope or all of its features.

One form of the present disclosure provides a method for producing a multi-layer coating on a substrate for an anode or cathode. The method includes preparing a first mixture including a first solvent and a first active material, preparing a second mixture including a second solvent and a second active material, combining the first mixture and the second mixture to form a slurry, and coating the substrate with the slurry. The first solvent and the second solvent are immiscible.

In variations of this method, which may be employed individually or in any combination: the first solvent is a water-based solvent, the second solvent is an oil-based solvent or a hydrocarbon-based solvent, the substrate is an anode and the first active material is natural graphite and the second active material is at least one of natural graphite or artificial graphite, the substrate is a cathode and the first active material is at least one of NCM (Nickel Cobalt Manganese) 523 and NCM with a nickel content of less than or equal to about 50% by atomic composition and the second active material is at least one of NCM Ni88+ or a lithium-rich-manganese-rich layer, at least one of the first mixture and the second mixture further includes at least one of a binder and a conductive material, and the conductive material is at least one of graphene or graphene nanotubes.

Another form of the present disclosure provides a method for coating a substrate for an anode or a cathode of a lithium-ion battery. The method includes preparing an aqueous-based mixture including a first active material, preparing an oil-based or hydrocarbon-based mixture including a second active material, combining the aqueous-based mixture and the oil-based or hydrocarbon-based mixture to form a slurry, and coating the substrate with the slurry.

In variations of this method, which may be employed individually or in any combination: the substrate is an anode and the first active material is natural graphite, the second active material is natural or artificial graphite, the aqueous-based mixture further incudes a binder, the oil-based or hydrocarbon-based mixture further includes a binder, the substrate is a cathode and the first active material is at least one of NCM 523 and NCM with a nickel content of less than or equal to about 50% by atomic composition, and the second active material is one of NCM Ni88+ or a lithium-rich-manganese-rich layer.

A further form of the present disclosure provides a method for coating a substrate for an anode or a cathode of a lithium-ion battery. The method includes combining a plurality of immiscible solvents, wherein a first solvent includes a first active material and a second solvent includes a second active material, and coating the substrate with the plurality of immiscible solvents.

In variations of this method, which may be employed individually or in any combination: the first solvent is an aqueous-based solvent, the second solvent is an oil-based solvent or a hydrocarbon-based solvent, the substrate is an anode and the first active material is natural graphite and the second active material is at least one of natural graphite or artificial graphite, and the substrate is a cathode and the first active material is at least one of NCM 523 and NCM with a nickel content of less than or equal to about 50% by atomic composition and the second active material is at least one of NCM Ni88+ or a lithium-rich-manganese-rich layer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
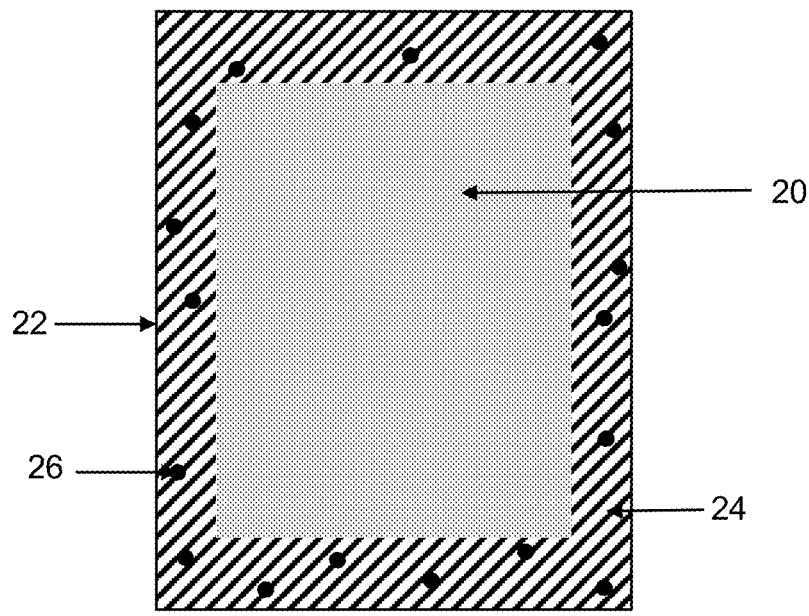
FIG. 1A illustrates a substrate which is coated in a slurry according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The use of immiscible solvents to naturally create layer separation between multiple active materials in a slurry provides an efficient method for coating substrates of batteries. Referring to FIG. 1A, a substrate 20 (e.g., an anode or a cathode) of a lithium-ion battery is shown. The substrate 20 may comprise copper, aluminum, nickel, and stainless steel, among others. As shown, the substrate 20 is coated with a slurry 22.

While the slurry 22 is shown as coating the entire surface of the substrate 20, it should be understood that the slurry 22 may coat less than the entire surface of the substrate 20. For example, the slurry 22 may coat about 25% of the surface of the substrate 20, may coat about 50% of the surface of the substrate 20, or may coat about 75% of the surface of the substrate 20. In an aspect of the present disclosure, the slurry 22 may coat less than or equal to about 100% of the surface of the substrate 20.

Figure 2:
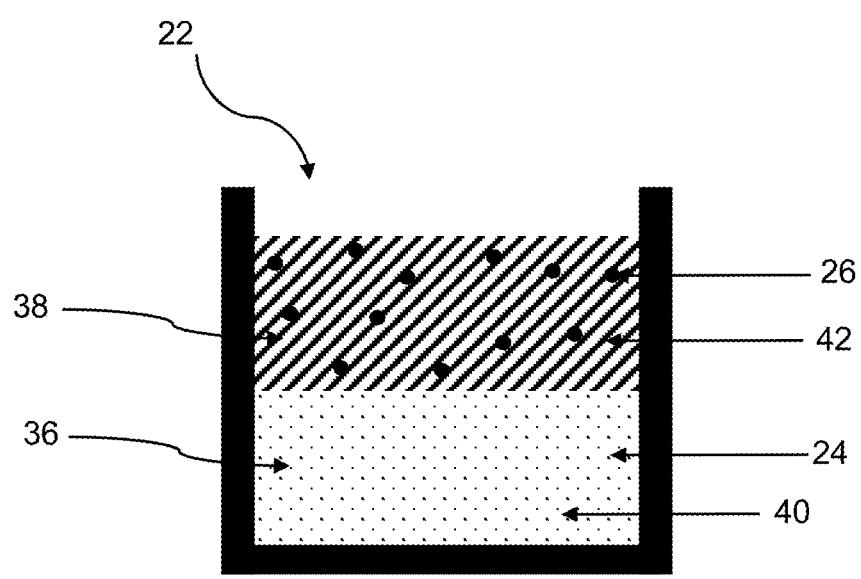
FIG. 2 is a schematic view of a slurry prepared according to the present disclosure.

Referring to FIG. 2, the slurry 22 comprises a first mixture 36 and a second mixture 38. The first mixture 36 comprises a first solvent 40 and a first active material 24. The second mixture 38 comprises a second solvent 42 and a second active material 26. By way of non-limiting example, the first solvent 40 may be an aqueous solvent, among others. The first active material 24 may comprise, for example, natural graphite, NCM 523, NCM with a nickel content of less than or equal to about 50% by atomic composition, among others. The second solvent 42 may be an oil-based solvent, a hydrocarbon-based solvent, or other immiscible solvent, among others. The second active material 26 may comprise at least one of natural graphite, artificial graphite, NCM Ni88+, and a lithium-rich-manganese-rich layer, among others. The first solvent 40 and the second solvent 42 include at least an immiscible pair of solvents. For example, the immiscible pair may include water-heptane, water-oil, water-hexane, water-pentane, water-diethyl ether, water-carbon tetrachloride, heptane-acetonitrile, or cyclohexane-dimethylformamide, among others.

In an aspect, the slurry 22 may be prepared by dispersing at least a first active material 24, a second active material 26, a first solvent 40, and a second solvent 42 into a planetary mixer and mixing for greater than or equal to about 5 minutes to less than or equal to about 120 minutes at room temperature, depending on the stirring speed of the planetary mixer. In an aspect of the present disclosure, the slurry 22 is stirred at greater than or equal to about 10 revolutions per minute (RPM) to less than or equal to about 40 RPM. In another aspect, the slurry may be stirred at a first speed for a first period of time, then stirred at a second speed for a second period of time, and then stirred at a third speed for a third period of time. While first, second, and third time periods and first, second and third speeds are disclosed herein, it should be understood that the present disclosure is not limited thereto. By way of non-limiting example, in one variation, the slurry 22 is stirred at about 10 RPM for about 10 minutes, then stirred at about 30 RPM for about 10 minutes, and then stirred at about 10 RPM for about 5 minutes. The stirring speed of the planetary mixer depends on the composition of the slurry 22. Optionally, a binder and conducting materials may also be dispersed into the planetary mixer.

It should be understood that the aforementioned are provided as examples and are not intended to limit the scope of the present disclosure. By way of not-limiting example, additional mixtures may be provided so long as each mixture is immiscible with each other mixture. Accordingly, it is contemplated that more than two layers of active materials may be formed on the substrate and yet be within the scope of the present disclosure.

In variations of the present disclosure, at least one of the first mixture and the second mixture further comprises at least one of a binder and a conductive material. At least one of the first mixture and the second mixture may comprise greater than or equal to about 80% by weight to less than or equal to about 99% by weight of the first active material or the second active material, respectively, greater than or equal to about 1% by weight to less than or equal to about 10% by weight of the binder, and greater than or equal to about 1% by weight to less than or equal to about 10% by weight of the conductive material, wherein the first active material, the second active material, the binder, and the conductive material add up to 100%. In an aspect, at least one of the first mixture and the second mixture may comprise about 90% by weight of the first active material or the second active material, respectively, about 5% by weight of the binder, and about 5% by weight of the conductive material. The binder helps the coating adhere to the substrate 20 and helps achieve good particle (e.g., active material) dispersion in the solvent. The binder must also be able to withstand the harsh environment of the battery and have a certain degree of pliability in order to avoid cracking. The binder may include pure poly vinylene fluoride (PVdF), PVdF cross-linked with hexaflyoropropene (HFP), PVdF cross-linked with s-butyl rubber (SBR) and carboxymethyl cellulose (CMC), or PVdF cross-linked with poly vinyl alcohol (PVA), among others, and mixtures thereof.

The conductive material provides for electron transport in the electrode layer which, in turn, provides increased electrode conductivity. The conductive material may be at least one of carbon black, graphene, and graphene nanotubes; however, the present disclosure is not limited thereto.

Figure 1B:
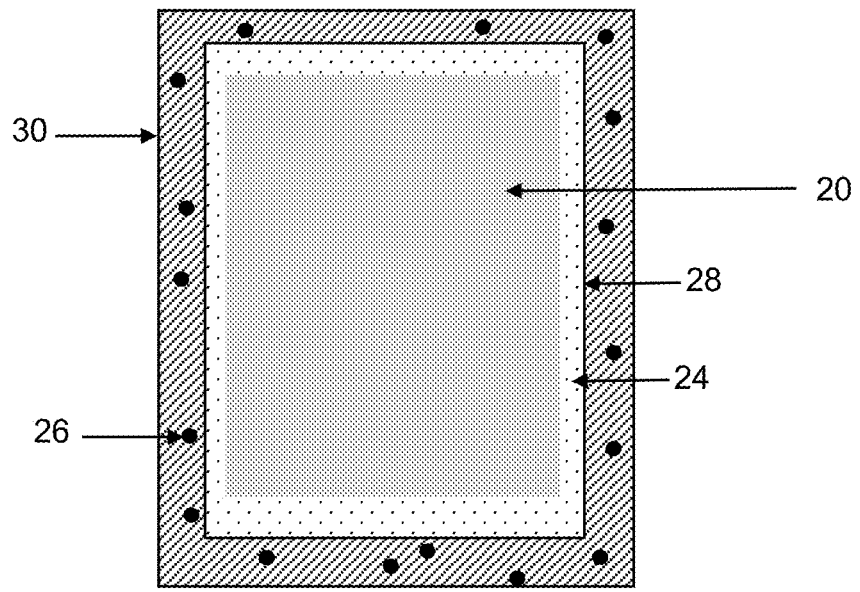
FIG. 1B illustrates a coated substrate according to the present disclosure wherein the slurry has separated into multiple layers.

After a period of time, for example after greater than or equal to about 2 minutes to less than or equal to about 180 minutes, the first mixture and the second mixture of the slurry 22 naturally separate into distinct layers 28, 30, as illustrated in FIG. 1B. This separation of the first mixture and the second mixture results from the immiscibility of the first solvent and the second solvent.

Figure 3:
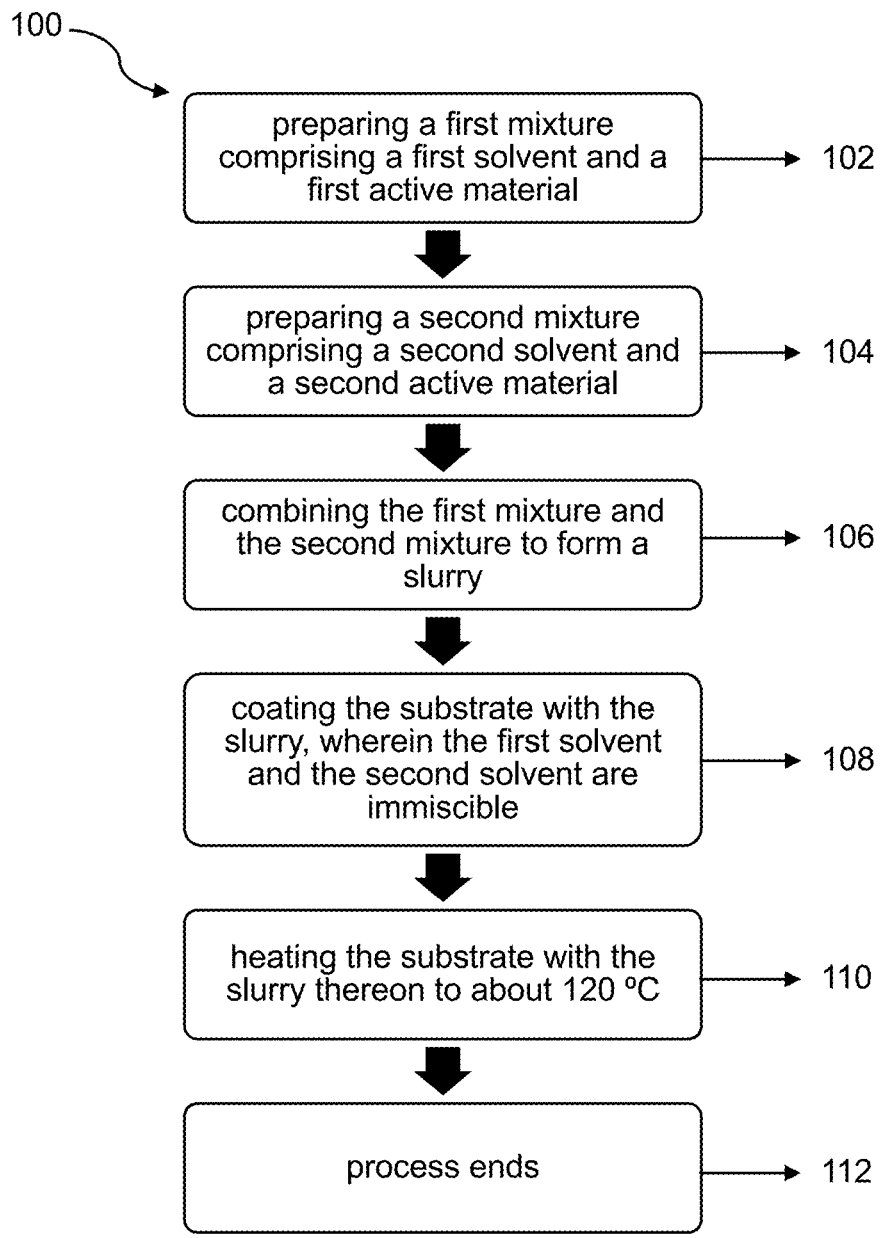
FIG. 3 illustrates a method of producing a multi-layer coating on a substrate for an anode or cathode according to one form of the present disclosure.

In one form of the present disclosure illustrated in FIG. 3, a method 100 for producing a multi-layer coating on a substrate (e.g., substrate 20) for an anode or a cathode includes preparing a first mixture (such as the first mixture described previously) comprising a first solvent including a first active material, at step 102.

At step 104, a second mixture (such as the second mixture described previously) is prepared. The second mixture comprises a second solvent and a second active material.

When it is contemplated that the substrate is an anode, the first active material may comprise natural graphite and the second active material may comprise at least one of natural graphite and artificial graphite.

When it is contemplated that the substrate is a cathode, the first active material may comprise at least one of NCM 523 and NCM with a nickel content of less than or equal to about 50% by atomic composition, among others, and the second active material may comprise at least one of NCM Ni88+ and a lithium-rich-manganese-rich layer, among others.

Figure 1C:
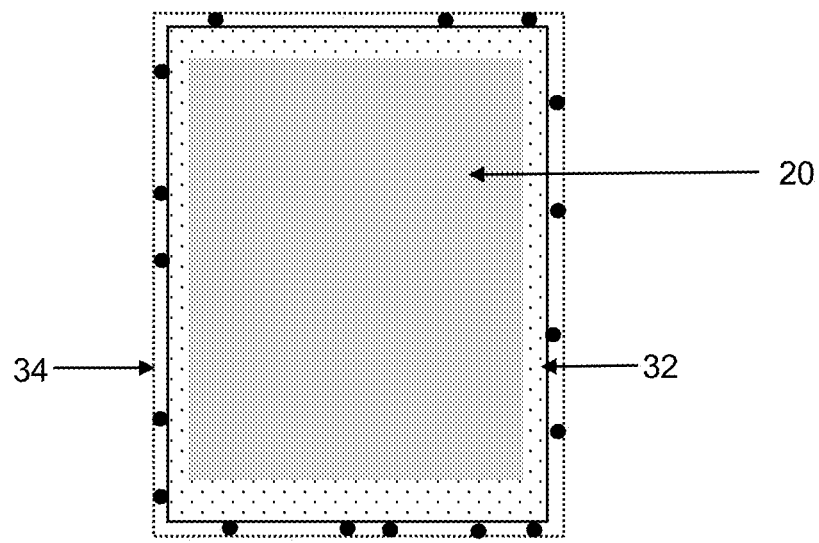
FIG. 1C illustrates a coated substrate according to the present disclosure after drying to remove the first solvent and the second solvent.
Figure 1D:
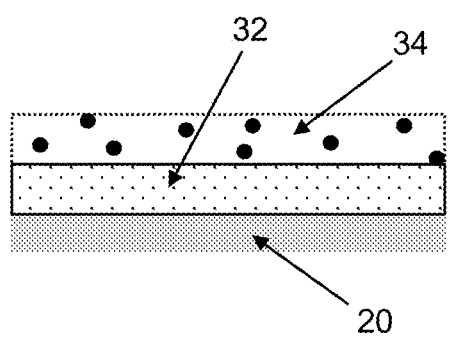
FIG. 1D illustrates a cross-sectional view of the multi-layer coated substrate illustrated in FIG. 1C.

Both the first mixture and the second mixture are prepared at about room temperature. After the first mixture and the second mixture are prepared, the first and second mixtures are combined, at step 106, to form a slurry (e.g., slurry 22). At step 108, the substrate is coated with the slurry. After a period of time, the first mixture and the second mixture separate to form distinct layers as a result of the immiscibility of the first solvent and the second solvent. At step 110, the substrate with the slurry thereon is then heated at about 120° C. to remove the first solvent and the second solvent thereby forming a multi-layered coating, as shown by way of example in FIG. 1C. It is contemplated that the first active material forms a first layer 32 of the multi-layered coating, and the second active material forms a second layer 34 (shown in phantom) of the multilayered coating. Optionally, the substrate with the multi-layer coating is then cooled to about room temperature. The process ends at step 112. A cross-sectional view of the substrate having a multi-layer coating after step 112 is illustrated in FIG. 1D.

Figure 4:
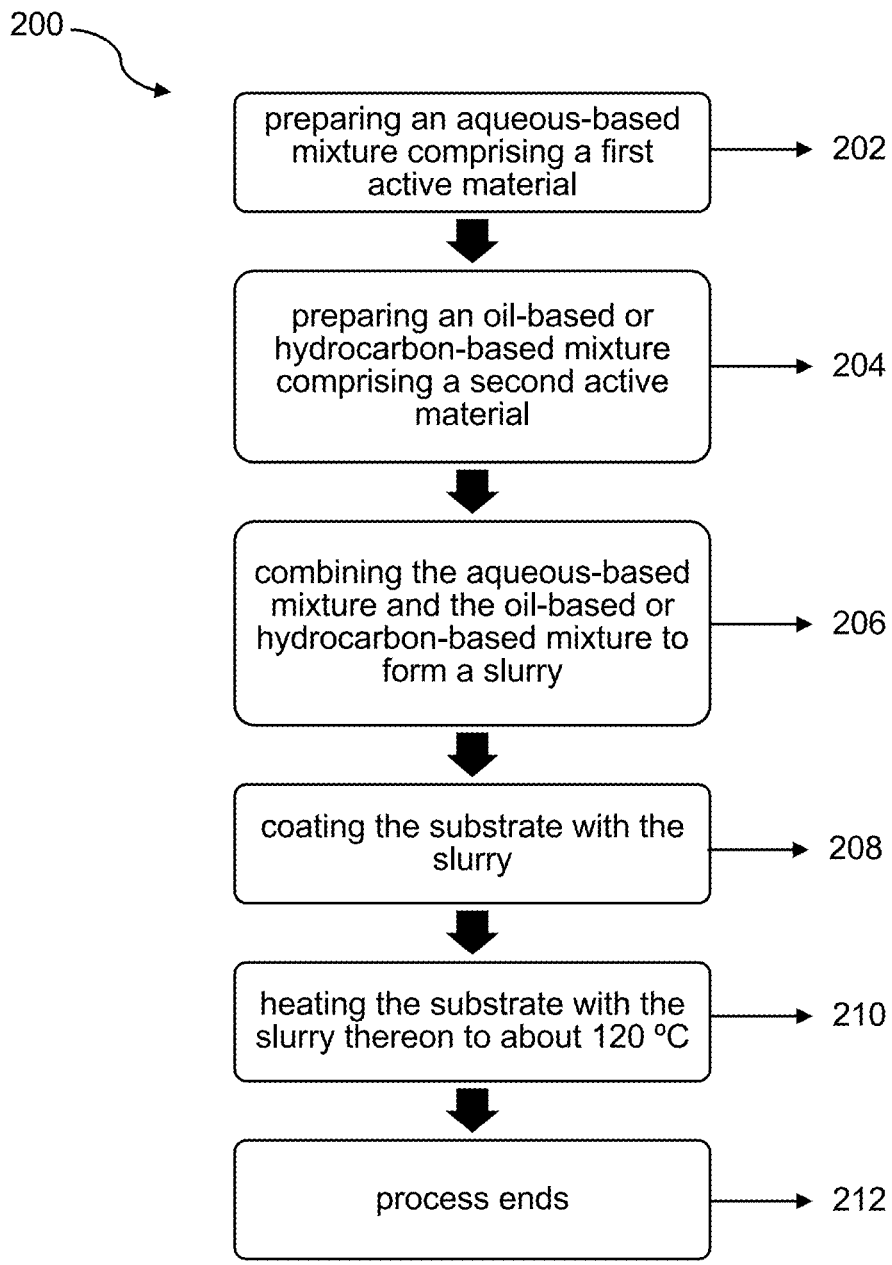
FIG. 4 illustrates a method for coating a substrate for an anode or a cathode of a lithium-ion battery according to another form of the present disclosure.

Referring now to FIG. 4, in another form of the present disclosure, a method 200 for coating a substrate for an anode or a cathode of a lithium-ion battery comprises preparing an aqueous-based mixture comprising a first active material as discussed previously, at step 202.

At step 204, the method 200 further comprises preparing an oil-based or hydrocarbon-based mixture comprising a second active material as discussed previously. Both the aqueous-based mixture and the oil-based or hydrocarbon-based mixture are prepared at about room temperature.

After the aqueous-based mixture and the oil-based or hydrocarbon-based mixture are prepared, the aqueous-based mixture and the oil-based or hydrocarbon-based mixture are combined to form a slurry, at step 206. At step 208, the substrate is coated with the slurry. After a period of time, the aqueous-based mixture and the oil-based or hydrocarbon-based mixture separate to form distinct layers as a result of the immiscibility of the aqueous-based mixture and the oil-based or hydrocarbon-based mixture. At step 210, the substrate with the slurry thereon is then heated at about 120° C. to remove the aqueous-based solvent and the oil-based or hydrocarbon-based solvent thereby forming a multi-layered coating. Optionally, the substrate with the multi-layer coating is then cooled to about room temperature. The process ends at step 212.

In a variation of the method 200 of the present disclosure, the substrate is an anode and the first active material is graphite. In another variation of the method 200 of the present disclosure, the substrate is a cathode and the first active material is at least one of NCM 523 and NCM with a nickel content of less than or equal to about 50% by atomic composition. In a further variation of the method 200 of the present disclosure, the second active material is natural graphite or artificial graphite. In yet another variation of the method 200 of the present disclosure, the second active material is one of one of NCM Ni88+ or a lithium-rich-manganese-rich layer.

At least one of the aqueous-based mixture and the oil-based or hydrocarbon-based mixture may further comprise at least one of a binder and a conductive material as discussed previously.

Figure 5:
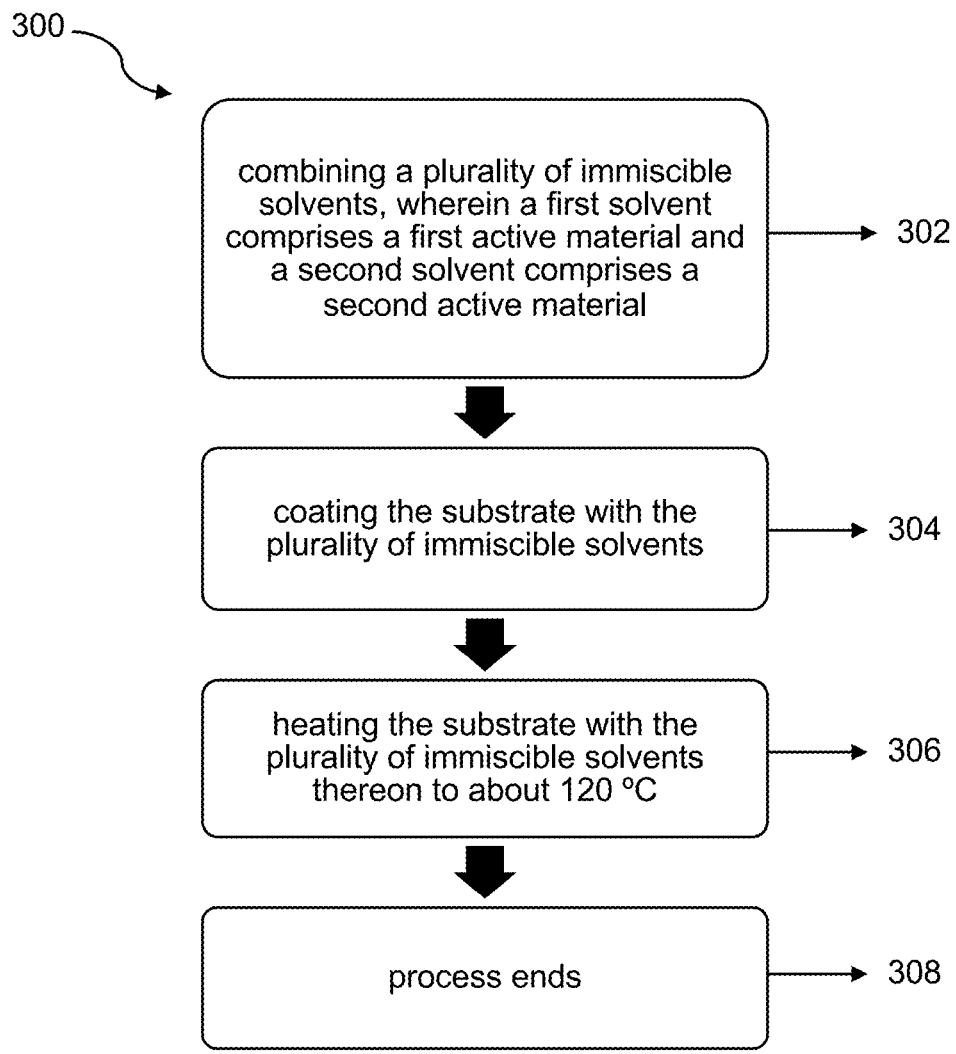
FIG. 5 illustrates a method for coating a substrate for an anode or a cathode of a lithium-ion battery according to a further form of the present disclosure.

In a further form of the present disclosure as illustrated in FIG. 5, a method 300 for coating a substrate for an anode or a cathode of a lithium-ion battery comprises combining a plurality of immiscible solvents, at step 302, and coating the substrate with the plurality of immiscible solvents, at step 304. A first solvent comprises a first active material and a second solvent comprises a second active material, such as those discussed previously.

After a period of time, the immiscible solvents separate creating multiple layers, each layer containing one of the first active material and the second active material. At step 306, the substrate with the plurality of immiscible solvents thereon is then heated at about 120° C. to remove the immiscible solvents thereby forming a multi-layered coating. Optionally, the substrate with the multi-layer coating is then cooled to about room temperature. The process ends at step 308.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing a multi-layer coating on a substrate for an anode or cathode, the method comprising:
   preparing a first mixture comprising a first solvent and a first active material;
   preparing a second mixture comprising a second solvent and a second active material;
   combining the first mixture and the second mixture to form a slurry; and
   coating the substrate with the slurry, wherein the first solvent and the second solvent are immiscible.

2. The method according to claim 1, wherein the first solvent comprises a water-based solvent.

3. The method according to claim 1, wherein the second solvent comprises an oil-based solvent or a hydrocarbon-based solvent.

4. The method according to claim 1, wherein the substrate is an anode and the first active material comprises natural graphite and the second active material comprises at least one of natural graphite or artificial graphite.

5. The method according to claim 1, wherein the substrate is a cathode and the first active material comprises at least one of nickel cobalt manganese (NCM) 523 and NCM with a nickel content of less than or equal to about 50% by atomic composition and the second active material comprises at least one of NCM Ni88+ or a lithium-rich-manganese-rich layer.

6. The method according to claim 1, wherein at least one of the first mixture and the second mixture further comprises at least one of a binder and a conductive material.

7. The method according to claim 6, wherein the conductive material comprises at least one of graphene or graphene nanotubes.

8. A method for coating a substrate for an anode or a cathode of a lithium-ion battery, the method comprising:
   preparing an aqueous-based mixture comprising a first active material;
   preparing an oil-based or hydrocarbon-based mixture comprising a second active material;
   combining the aqueous-based mixture and the oil-based or hydrocarbon-based mixture to form a slurry; and
   coating the substrate with the slurry.

9. The method according to claim 8, wherein the substrate is an anode and the first active material is natural graphite.

10. The method according to claim 9, wherein the second active material is natural or artificial graphite.

11. The method according to claim 8, wherein the aqueous-based mixture further comprises a binder.

12. The method according to claim 8, wherein the oil-based or hydrocarbon-based mixture further comprises a binder.

13. The method according to claim 8, wherein the substrate is a cathode and the first active material comprises at least one of NCM 523 and NCM with a nickel content of less than or equal to about 50% by atomic composition.

14. The method according to claim 13, wherein the second active material is one of NCM Ni88+ or a lithium-rich-manganese-rich layer.

15. The method according to claim 13, wherein the aqueous-based mixture further comprises a binder.

16. A method for coating a substrate for an anode or a cathode of a lithium-ion battery, the method comprising:
    combining a plurality of immiscible solvents, wherein a first solvent comprises a first active material and a second solvent comprises a second active material; and
    coating the substrate with the plurality of immiscible solvents.

17. The method according to claim 16, wherein the first solvent comprises an aqueous-based solvent.

18. The method according to claim 16, wherein the second solvent comprises an oil-based solvent or a hydrocarbon-based solvent.

19. The method according to claim 16, wherein the substrate is an anode and the first active material comprises natural graphite and the second active material comprises at least one of natural graphite or artificial graphite.

20. The method according to claim 16, wherein the substrate is a cathode and the first active material comprises at least one of NCM 523 and NCM with a nickel content of less than or equal to about 50% by atomic composition and the second active material comprises at least one of NCM Ni88+ or a lithium-rich-manganese-rich layer.

* * * * *